(12) United States Patent
Sauler et al.

(10) Patent No.: US 6,742,500 B2
(45) Date of Patent: Jun. 1, 2004

(54) METHOD FOR OPERATING AN INTERNAL COMBUSTION ENGINE, AND CORRESPONDING DEVICE

(75) Inventors: Juergen Sauler, Stuttgart (DE); Axel Heinstein, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 124 days.

(21) Appl. No.: 10/089,906

(22) PCT Filed: Aug. 2, 2001

(86) PCT No.: PCT/DE01/02940

§ 371 (c)(1),
(2), (4) Date: Jul. 26, 2002

(87) PCT Pub. No.: WO02/20963

PCT Pub. Date: Mar. 14, 2002

(65) Prior Publication Data

US 2003/0029416 A1 Feb. 13, 2003

(30) Foreign Application Priority Data

Sep. 4, 2000  (DE) .......................................... 100 43 700

(51) Int. Cl.⁷ .................................................. F02P 5/00
(52) U.S. Cl. ............................ 123/406.16; 123/406.21; 123/406.29
(58) Field of Search ...................... 123/406.16, 406.21, 123/406.29, 406.11

(56) References Cited

U.S. PATENT DOCUMENTS

| | | | | |
|---|---|---|---|---|
| 4,565,171 A | * | 1/1986 | Sugiura et al. | ........ 123/406.21 |
| 4,846,130 A | | 7/1989 | Jensen | |
| 6,041,756 A | | 3/2000 | Bonne | |

FOREIGN PATENT DOCUMENTS

DE              199 08 729          9/2000

* cited by examiner

Primary Examiner—Bibhu Mohanty
(74) Attorney, Agent, or Firm—Kenyon & Kenyon

(57) ABSTRACT

A method and a device for operating an internal combustion engine are provided, in which in at least one cylinder, combustion of a fuel in a fuel/air mixture introduced into the cylinder takes place. Upon the occurrence of knocking, a baseline ignition angle in the at least one cylinder is retarded in steps, using a knock control system, to an adjustment angle from the basic ignition angle. When the adjustment angle exceeds a definable threshold value, activation of the knock prevention operation mode occurs, in which context an additional action reducing the knock susceptibility of the fuel/air mixture is taken and the adjustment angle is decreased so that the baseline ignition angle is advanced.

26 Claims, No Drawings

METHOD FOR OPERATING AN INTERNAL COMBUSTION ENGINE, AND CORRESPONDING DEVICE

FIELD OF THE INVENTION

The invention relates to a method and device for operating an internal combustion.

BACKGROUND INFORMATION

A method for operating an internal combustion engine and a device including at least one cylinder are conventional; in that context the ignition angle in the at least one cylinder is displaced from the engine-speed-dependent or load-dependent basic ignition angle on the basis of utilization of a knock control system. The adjustment angle depends on the frequency of knocking in the at least one cylinder, and is greater, the more frequently the knock signal has occurred in the previous working cycles.

SUMMARY

The method according to the present invention and the device according to the present invention may provide, in contrast, the advantage that the reduction in torque caused by the ignition retard resulting from the knocking may be decreased. It may be possible to advance the ignition angle once again and thus achieve greater torque, and thereby increase the output of the internal combustion engine. Better efficiency may thus be achieved.

One action in the case of a direct gasoline injection internal combustion engine, in order to advance the ignition angle, may be to perform a double injection operation in one working cycle of a cylinder. By manner of a first injection, a lean basic mixture may first be formed in the respective cylinder, into which injection then occurs a second time. The lean basic mixture that may still be present in peripheral zones of the mixture even after the second injection reduces the knock susceptibility. In addition, the fuel delivered to the combustion chamber by the second injection cools the fuel/air mixture, which results in a further reduction in knock susceptibility. It may be advantageous, when a double injection is used, not to modify the volume of fuel to be injected as compared to a single injection, so that less fuel may be consumed in terms of the achievable output. An additional feature may be to a change in the exhaust gas recirculation rate, if an exhaust gas recirculation system is used in the internal combustion engine. At a higher exhaust gas recirculation rate, the knock susceptibility may also be reduced because of a decrease in the oxygen content of the fuel/air mixture.

It may be advantageous to employ as the representative adjustment angle the mean of all individual-cylinder retard angles of the cylinders, since an error-prone switchover may thereby be prevented. On the other hand, however, it also may be advantageous to employ the individual-cylinder retard angles as adjustment angles, and to carry out activation of the knock prevention operating mode in individual-cylinder fashion, so that a very accurate reaction to the individual cylinders' properties may take place.

It may be advantageous to carry out the knock prevention with double injection operating mode only above a definable first load threshold, since application of the knock prevention with double injection operating mode may be desirable only in a specific load range. Upon switching back into another operating mode when the load falls below a specific threshold value, it may be desirable to select that second load threshold value in such a manner that it lies below the first load threshold value, in order to prevent an unstable state and continual switching back and forth between two operating modes. Since both the first load threshold value and the second load threshold value may be different depending on the engine speed, it may be desirable to take this engine speed dependence into account.

For the knock prevention with exhaust gas recirculation operating mode as an additional action reducing the knock susceptibility, it may be desirable to access this only below a definable third load threshold value, since the exhaust gas recirculation feature yields no torque gain at higher loads. By analogy with the knock prevention with double injection operating mode, the intention is to eliminate unstable states between two operating modes, so that advantageously the fourth load threshold value, at which operation may be switched back from the knock prevention with exhaust gas recirculation operating mode into another operating mode, should lie above the second load threshold value. Since both the third load threshold value and the fourth load threshold value may be different depending on the engine speed, it may be desirable to take this engine speed dependency into account, by analogy with the knock prevention with double injection mode.

It may be advantageous, upon activation of the knock prevention operating mode, also to take as the basis for the basic ignition angle another load-dependent and/or engine-speed-dependent characteristics diagram specific to that operating mode, since the conditions in the combustion chamber and thus the ignitability of the fuel/air mixture have been greatly changed by the additional action.

DETAILED DESCRIPTION

Knocking, i.e. an abnormal combustion process in the combustion chamber of an internal combustion engine, limits output and efficiency and results in damage to the combustion chamber because of the high flame velocities. To prevent this, systems for knock detection and knock control may be integrated into modern internal combustion engines. Systems of this kind are conventional.

By the knock sensors belonging to the knock detection system, signals may be acquired from the combustion chamber and may be forwarded to an analysis unit also belonging to the knock detection system. Signals of this kind may be, for example, acoustic signals, electromagnetic signals, electrical signals, pressure signals, or temperature signals, which may be received inside or outside the combustion chamber by the knock sensors. The analysis unit performs an amplification of the signals and integrates the signals in suitable fashion, so that after an analog/digital conversion, the signals of the integrated values may be compared, in a microprocessor contained in the internal combustion engine, to a threshold value, in which context knocking may be detected if the threshold is exceeded. In addition, for example, a selection of a specific frequency band or a selection in terms of a specific time window may be performed in the analysis unit in order to suppress interference signals, the frequency band or time window being characteristic for the occurrence of knock signals.

If knocking has been detected, the knock control function may then be performed by the microprocessor integrated into the internal combustion engine, in that an adjustment angle may be added to a basic ignition angle, the sum constituting the baseline ignition angle. From the torque structure, a torque-based ignition angle may be calculated on the basis of the torque requests; this represents the earliest possible ignition angle. In the method for calculating the ignition angle, the baseline ignition angle and the torque-based ignition angle may then be compared to one another, in which context the later of the two ignition angles, i.e. the ignition angle closer to top dead center, serves as the ignition angle to be implemented. If the fuel/air mixture in the combustion chamber has a strong tendency to knock, the adjustment angle will assume large values; in the context of this Application, the adjustment angle may be defined as a positive value, so that the ignition angle may be greatly retarded, i.e. ignition occurs at a time closer to top dead center. The basic ignition angle may be read out from a load-dependent and/or engine-speed-dependent characteristics diagram that contains ignition angles under standard conditions and may be stored in the microprocessor of the internal combustion engine. It contains values for the basic ignition angle that may be associated with specific engine speed and/or load ranges. The engine speed, in this context, may be ascertained by sensors that may be mounted on the crankshaft. The load, i.e. the relative air charge of the cylinder, may be ascertained by the microprocessor using models, on the basis of a variety of operating parameters such as engine speed and torque request, and on the basis of readings of the hot film air mass sensor (HFM) and the intake manifold pressure sensor, the exhaust gas recirculation rate, or the position of the throttle valve, and may be made available for the determination of the basic ignition angle. The relative air charge may be defined as the ratio between the instantaneous air charge and the air charge under standard conditions for the cylinder. Adjustment of the ignition angle by the knock control system may be performed until no further knocking occurs. The adjustment of the ignition angle in the individual steps adds up to an adjustment angle that indicates the total adjustment of the ignition angle with reference to the basic ignition angle. If no further knocking occurs for a specific period of time, the ignition angle may then be once again advanced by the knock control system, i.e. the ignition angle may be located at crankshaft angles farther away from top dead center. The adjustment angle becomes correspondingly smaller as a result of the advancing of the ignition angle. A disadvantage of the conventional knock control method is that when the ignition angle is greatly retarded, the achievable torque and therefore efficiency may be greatly decreased.

The method according to the present invention for operating an internal combustion engine may be characterized, in contrast, by a new operating mode that may be carried out both in a direct gasoline-injection internal combustion engine and in an internal combustion engine with manifold injection. The method may be performed by a microprocessor located in the internal combustion engine. If the adjustment angle of the knock control system is greater than a specific definable threshold value, the microprocessor then activates a knock prevention operating mode which encompasses the fact that an action reducing the knock susceptibility is performed, and the adjustment angle is correspondingly modified in such a manner that the baseline ignition angle is advanced. A torque gain, and thus an increase in efficiency, may thereby be achieved.

In an example embodiment of the invention, two injection operations may be performed in one working cycle of a cylinder as the action reducing the knock susceptibility in a direct gasoline-injection internal combustion engine. The performance of two injection operations in one working cycle may also be referred to as "double injection." One working cycle encompasses the cycle of the four strokes of an engine using the four-stroke process-intake stroke, compression stroke, power stroke, and exhaust stroke—or the two strokes of an engine using the two-stroke process—scavenging and compression stroke, and power stroke. In this example embodiment, the modification of the adjustment angle may be performed in such a manner that the adjustment angle may be decreased, which means that the baseline ignition angle may be advanced. Injection of fuel into the combustion chamber twice in one working cycle may be carried out in such a manner that during the intake stroke or the scavenging and compression stroke, a homogeneous lean basic mixture may be created by manner of a first injection. Into this homogeneous basic mixture, shortly before ignition (i.e. in the compression stroke or also in the scavenging and compression stroke), a rich cloud may be placed around the spark plug by a second injection. This stratification guarantees reliable ignition of the fuel/air mixture in the combustion chamber, while at the same time knock susceptibility may be reduced because of the leaner edge zones. A reduction in knock susceptibility may also be achieved in such a manner that the combustion chamber may be cooled by the second injection of fuel. In this context, the total fuel quantity may not be increased as compared to a single injection, but rather the fuel quantity may be distributed over the two injection operations. Because of the greater torque achievable as a result of the earlier ignition angle, it may be possible to attain greater efficiency with the same fuel consumption, thereby reducing the consumption of the internal combustion engine as a function of output.

In a further example embodiment, the action reducing the knock susceptibility may encompass an increase in the exhaust gas recirculation rate, if an exhaust gas recirculation system is integrated into the system of the internal combustion engine.

This action may be performed both in a direct gasoline-injection internal combustion engine and in an internal combustion engine with manifold injection. In this context, exhaust gas recirculation includes both internal and external exhaust gas recirculation, the term "internal exhaust gas recirculation" being applied to the operation in which the exhaust gas in the cylinder is not completely expelled, but instead exhaust gas remains in the cylinder and is once again a constituent of the fuel/air mixture in the cylinder in the next working cycle. "External exhaust gas recirculation" encompasses the recirculation of exhaust gas from the exhaust system into the intake manifold of the internal combustion engine. The external exhaust gas recirculation rate may be influenced by manner of the exhaust gas recirculation valve, which in turn may be controlled by the microprocessor. The internal exhaust gas recirculation rate may be influenced by the camshaft setting. An increase in the exhaust gas recirculation rate decreases the oxygen content of the fuel/air mixture present in the cylinder, making it difficult for abnormal combustion processes to occur in the combustion chamber.

In a still further example embodiment, the basic ignition angle may be taken from another characteristics diagram, specific to the knock prevention operating mode, that may also be stored in the microprocessor. The specific characteristics diagram may be different depending on the knock susceptibility-reducing action that is taken. The modified characteristics diagram for the knock prevention operating mode takes into account the modified conditions for ignition of the fuel/air mixture in the combustion chamber as a result of the double injection or the modification of the exhaust gas recirculation rate. In this example embodiment, during the knock prevention operating mode the knock control and knock detection functions continue to be performed. This means that the adjustment angle, which has been modified by the transition into the knock prevention operating mode, continues to be adapted in accordance with the occurrence of knocking events. In an example embodiment, upon transition into the knock prevention operating mode the so-called "fast advance" for the ignition angle may be activated; in this, the adjustment angle may be decreased either with a greater step size or at a greater frequency as compared to the advance otherwise performed. The adjustment angle may be decreased until knocking is detected, which in turn results in a retarding of the ignition angle.

In a still further example embodiment, the knock prevention with double injection operating mode is not activated until the respective present load value has exceeded a specific definable first load threshold value. In an example embodiment, this first load threshold value may be additionally dependent on engine speed, the first load threshold value being read out of a characteristic curve that may be stored in the microprocessor of the internal combustion engine. In the characteristic curve of the first load threshold value, values for the first load threshold value may be associated with individual engine speed ranges. An example embodiment of the invention concerns departure from the knock prevention with double injection operating mode. If the load falls below a second load threshold value, the microprocessor of the internal combustion engine performs a switchover into another operating mode. Such operating modes may be, for example, the homogeneous, homogeneous-lean, or stratified modes. These operating modes are conventional for the direct gasoline-injection internal combustion engine. Various operating modes differ by having a fundamentally different configuration of important operating variables and underlying model concepts. Important operating variables in this context may be the number of injection operations in one working cycle, the injection angle, the injection duration, the quantity of fuel injected and therefore the air ratio $\lambda$, and the ignition angle. One underlying model concept may be, for example, the torque model. It is noteworthy for this example embodiment that the second load threshold value lies below the first load threshold value, so that a hysteresis loop may be traversed in terms of the load threshold value for the knock prevention operating mode. This prevents the internal combustion engine from attaining an unstable state between the knock prevention operating mode and another operating mode, and continually switching back and forth between the two operating modes. In a first example embodiment, the second load threshold may be ascertained in such a manner that a specific load threshold value difference may be subtracted from the first load threshold value. This load threshold value difference may be stored in engine speed-dependent fashion in the microprocessor of the internal combustion engine. In a second example embodiment, the second load threshold value may be read out directly in the microprocessor of the internal combustion engine from a characteristic curve that may be engine speed-dependent, similarly to the first threshold value. The values of the second load threshold value may be stored in the characteristic curve in such a manner that they are smaller than the values of the first load threshold value.

In a still further example embodiment, the knock prevention with exhaust gas recirculation operating mode is not activated until the respective present load value has fallen below a specific definable third load threshold value, since the exhaust gas recirculation action may be used principally in low load ranges. In an example embodiment, this third load threshold value may be additionally dependent on engine speed, the third load threshold value being read out from a characteristic curve that may be stored in the microprocessor of the internal combustion engine. In the characteristic curve of the third load threshold value, values for the third load threshold value may be associated with individual engine speed ranges. A further example embodiment concerns departure from the knock prevention with exhaust gas recirculation operating mode. If the load exceeds a fourth load threshold value, the microprocessor of the internal combustion engine then performs a switchover into another operating mode. Such operating modes may be, for example, in the case of direct gasoline-injection internal combustion engines, the homogeneous, homogeneous-lean, or stratified modes already mentioned; or in the case of internal combustion engines with manifold injection, operation without knock prevention. It may be noteworthy for this example embodiment that the fourth load threshold value lies above the third load threshold value, so that a hysteresis loop may be traversed in terms of the load threshold value for the knock prevention operating mode. This prevents the internal combustion engine from attaining an unstable state between the knock prevention operating mode and another operating mode, and continually switching back and forth between the two operating modes. In a first example embodiment, the fourth load threshold may be ascertained in such a manner that a specific load threshold value difference may be subtracted from the third load threshold value. This load threshold value difference may be stored in engine speed-dependent fashion in the microprocessor of the internal combustion engine. In a second example embodiment, the fourth load threshold value may be read out directly in the microprocessor of the internal combustion engine from a characteristic curve that may be engine speed-dependent, similarly to the third threshold value. The values of the fourth load threshold value may be stored in the characteristic curve in such a manner,that they are smaller than the values of the third load threshold value.

In a further example embodiment, the switchover into the knock prevention operating mode may be accomplished both in individual-cylinder fashion and simultaneously for all cylinders of the internal combustion engine. In the case of individual-cylinder switchover into the knock prevention operating mode, the adjustment angle of the respective cylinder may be employed as the adjustment angle. If a switchover into the knock prevention operating mode is performed simultaneously for all cylinders, it may then be advantageous to employ as the adjustment angle for the ignition angle the mean of the individual-cylinder adjustment angles for the ignition angle. In this context, the arithmetic mean of the individual-cylinder adjustment angles may be calculated. This calculation may in turn be performed by the microprocessor of the internal combustion engine.

The provision of the knock prevention operating mode may result, because of an advancing of the ignition angle, in a torque gain and thus an increase in efficiency. The operating mode may easily be implemented for direct gasoline-injection internal combustion engines, since all that may be necessary is to modify the adjustment angle and to apply an additional action reducing the knock susceptibility of the fuel/air mixture.

What is claimed is:

1. A method for operating an internal combustion engine, comprising the steps of:

combusting fuel in a fuel/air mixture introduced into at least one cylinder of the engine;

retarding, using a knock control system, a baseline ignition angle in the at least one cylinder in steps upon occurrence of knocking, to an adjustment angle from the basic ignition angle;

reducing knock susceptibility of the fuel/air mixture by taking at least one additional action, when the adjustment angle exceeds a definable threshold value; and decreasing the adjustment angle so that the baseline ignition angle is advanced, when the adjustment angle exceeds a definable threshold value.

2. The method according to claim 1, wherein the additional action reducing knock susceptibility comprises, for a direct gasoline-injection internal combustion engine, providing an additional fuel-injection operation such that two fuel injection operations are performed in one working cycle.

3. The method according to claim 2, wherein a quantity of fuel to be injected in one working cycle is divided among the two injection operations.

4. The method according to claim 3, wherein the additional action reducing knock susceptibility comprises increasing the exhaust gas recirculation rate.

5. The method according to claim 4, wherein when a definable threshold is exceeded, one of performing the double injection only above a definable first load threshold value and performing the exhaust gas recirculation only below a third load threshold value.

6. The method according to claim 5, further comprising the step of:

continuing to operate the internal combustion engine with a different operating mode, after one of the load has fallen below a definable second load threshold value for the double injection and the load has exceeded a definable fourth load threshold value for the exhaust gas recirculation, the second load threshold value being less than the first load threshold value, and the fourth load threshold value being greater than the third load threshold value.

7. The method according to claim 6, wherein at least one of the first load threshold value, the second load threshold value, the third load threshold value and the fourth load threshold value are dependent on engine speed.

8. The method according to claim 7, further comprising the step of:

accelerating a rate of decrease of the adjustment angle when the definable threshold value is exceeded, acceleration of the rate of decrease being accomplished by one of use of a greater step size and a greater frequency of decrease steps.

9. The method according to claim 8, wherein a mean of the individual-cylinder retard angles of all cylinders is employed as the adjustment angle.

10. The method according to claim 9, wherein the threshold is defined with the same value for all cylinders.

11. The method according to claim 1, wherein an adjustment angle of a respective present cylinder is employed as the adjustment angle.

12. The method according to claim 11, wherein the threshold value is defined for each individual cylinder.

13. The method according to claim 12, wherein the basic ignition angle is read out from at least one of a load-dependent and an engine-speed-dependent characteristics diagram, and when the definable threshold value is exceeded, reading out the basic ignition angle from at least one of the load-dependent and the engine-speed-dependent characteristics diagram differing from the other operating modes.

14. A device for operating an internal combustion engine, having at least one cylinder, in which combustion of a fuel in a fuel/air mixture introduced into the at least one cylinder takes place, comprising:

a microprocessor-based knock control system, wherein upon occurrence of knocking, a baseline ignition angle in the at least one cylinder is retarded in steps to an adjustment angle from the basic ignition angle, the control system including an arrangement for, when the adjustment angle exceeds a definable threshold value, providing an additional action reducing knock susceptibility of the fuel/air mixture, and decreasing the adjustment angle so that the baseline ignition angle is advanced.

15. The device according to claim 14, wherein the additional action for reducing knock susceptibility includes performing an additional fuel-injection operation such that two fuel injection operations are provided in one working cycle, in a direct gasoline-injection internal combustion engine.

16. The device according to claim 15, wherein the microprocessor includes an arrangement for dividing a quantity of fuel to be injected among the two injection operations.

17. The device according to claim 16, wherein the additional action for reducing knock susceptibility includes increasing the exhaust gas recirculation rate.

18. The device according to claim 17, wherein the microprocessor includes an arrangement configured so that when the definable threshold is exceeded, at least one of the feature of double injection is performed only above a definable first load threshold value and the exhaust gas recirculation is performed only below a third load threshold value.

19. The device according to claim 18, wherein the microprocessor includes an arrangement configured so that one of after the load has fallen below a definable second load threshold value for the double injection and after the load has exceeded a definable fourth load threshold value for the exhaust gas recirculation, the internal combustion engine continues to operate with a different operating mode, the second load threshold value being less than the first load threshold value, and the fourth load threshold value being greater than the third load threshold value.

20. The device according to claim 19, wherein at least one of the first load threshold value, the second load threshold value, the third load threshold value and the fourth load threshold value are dependent on engine speed.

21. The device according to claim 20, further comprising an arrangement for accelerating a rate of decrease of the adjustment angle when the definable threshold value is exceeded, acceleration of the rate of decrease being achieved by at least one of a greater step size and a greater frequency of decrease steps.

22. The device according to claim 21, wherein the microprocessor includes an arrangement configured for employing a mean of the individual-cylinder retard angles of all cylinders as the adjustment angle.

23. The device according to claim 22, wherein the threshold can be defined with the same value for all cylinders.

24. The device according to claim 21, wherein the microprocessor includes an arrangement configured for employing an adjustment angle of a respective present cylinder as the adjustment angle.

25. The device according to claim 24, wherein the threshold value is defined for each individual cylinder.

26. The device according to claim 25, wherein the microprocessor includes an arrangement configured for reading out the basic ignition angle from at least one of a load-dependent and engine-speed-dependent characteristics diagram, and when the definable threshold value is exceeded, the basic ignition angle is read out from at least one of the load-dependent and engine-speed-dependent characteristics diagram differing from the other operating modes.

* * * * *